INVENTOR
George R. Dempster
and Harry W. Jones
BY
ATTORNEYS

June 19, 1956  G. R. DEMPSTER ET AL  2,751,100
TRANSPORTING AND DUMPING EQUIPMENT Filed July 27, 1954  6 Sheets-Sheet 5

INVENTOR
George R. Dempster
and Harry W. Jones
BY
ATTORNEYS

United States Patent Office 2,751,100
Patented June 19, 1956

2,751,100

TRANSPORTING AND DUMPING EQUIPMENT

George R. Dempster and Harry W. Jones, Knoxville, Tenn.; said Jones assignor to Dempster Brothers, Inc., Knoxville, Tenn., a corporation of Tennessee Application July 27, 1954, Serial No. 446,012

10 Claims. (Cl. 214—317)

This invention relates to improvements in transporting and dumping equipment, and more particularly for the elevating and transporting of containers which may be hauled to a desired point and are dumped to remove the contents therefrom, while such containers are still supported directly on the transport vehicle.

Transporting and dumping equipment of this general type has been used heretofore wherein a truck chassis is provided with means for raising and lowering containers with respect to a skid frame mounted on the truck chassis. Such equipment was provided with lifting means to elevate the container onto the skid frame and to support it on the chassis during transportation, as well as means for dumping the container while supported by the truck chassis or the lifting means thereon, after which the container may be returned to the point of filling.

The maximum heights to which such equipment as used heretofore could lift the bottom of the container has been just above the bed of the chassis or the sub-frame mounted thereon, and in no event has it been possible heretofore to use such equipment in raising the bottom of the container to abnormal heights of the order or from fifteen to twenty feet above the ground. Nevertheless, there is a need for lifting of containers to such abnormal heights, especially for the loading and unloading of aircraft, dumping into railway cars or motor vehicle trucks, etc., where a height of from fifteen to twenty feet is often encountered.

One object of this invention is to provide transporting and dumping equipment of the type described, wherein the container may be elevated to an abnormal height above the ground where it may be unloaded or dumped, while yet supported on the transport vehicle.

Another object of the invention is to improve the construction of equipment of the type described to enable such equipment to elevate a container to a substantial height above the ground and to provide therein for the dumping of the contents of the container, after which the container may be returned to its lowered position for transporting and/or refilling.

A further object of the invention is to provide, in automatic dumping equipment for a container, a connecting or hook device mounted on the skid frame for raising and lowering movement relative thereto.

Still another object of the invention is to improve the construction and manner of operation of the raising and lowering means for the transporting equipment to provide a triple action therein which will raise the container to an abnormal height and yet provide for the dumping action of the container, as desirable.

Still another object of the invention is to provide a flexible cable device in the hoisting mechanism actuated by a power cylinder device, such as a hydraulic hoist, to impart extreme movement to the elevating means through the flexible cable device, whereby a relatively short stroke of the hoist will impart a long stroke to the elevating device.

A still further object of the invention is to provide in transporting equipment of the type using flexible cables for raising and lowering the hoisting means, for retaining the cables against hazardous outward swinging motion when the vehicle is travelling along a highway or around curves, and to confine the cable device on the vehicle during transportation.

An additional object of the invention is to provide for lifting the container off the ground sufficiently for transportation by a rocking motion of the hoisting mechanism on the vehicle without the necessity for any positive raising of the container by the hoisting means.

Another object of the invention is to provide for retaining the container against side sway during transportation, by retaining members at the ends of the container mounted on the fenders or other suitable part of the vehicle.

These objects may be accomplished according to certain embodiments of the invention utilizing transporting equipment mounted on a motor vehicle. Such transporting equipment preferably comprises a skid frame secured in desired relation to the vehicle and having telescoped therewith or mounted thereon a travelling carriage, which in turn has a shuttle supported thereby. These parts are assembled in telescoped relation, capable of extending movement in an upward direction from the vehicle. Such extending action preferably is accomplished by fluid power devices, such as hydraulic hoists.

In order to extend the elevating actions of the respective devices without unduly lengthening the cylinders of the hoists employed, it is preferred to utilize flexible cable means to give triple action thereto for raising and lowering a container with respect thereto by the elevating or lowering action of the carriage and elevator. The flexible cable device is anchored at one end to a fixed point on the elevator and extends therefrom around a sheave on the skid frame, thence over a sheave on the elevator, to the point of connection with the container.

In one embodiment, a flexible device, having the connections mentioned, is provided at each opposite side of the transporting equipment for connection with respective opposite ends of the container. Then, upon actuation of the fluid power devices, one or more of which may be provided for each of the elevator and shuttle, the container will be lifted to an abnormally high position, due to the telescoped relation of these parts as mentioned, where it may be engaged for dumping at such elevated position. Heights of the bottom of the container of from fifteen to twenty feet from the ground may be reached by this device, which is especially desirable in the loading or unloading of aircraft, the dumping into railway cars, motor vehicle trucks, etc.

The elevator is movably mounted on the carriage, so as to be extended in an upward direction relative thereto, by the action of the hoisting device that may be connected with a cross arm secured to the elevator. The shuttle in turn is movably connected with the elevator, as mentioned above. The shuttle preferably supports the hook or hooks with which the container is adapted to be connected for dumping automatically in the elevated position mentioned. Thus, the shuttle extends above the upper end of the elevator against which the container abuts in its elevated position during loading or unloading, and especially for dumping the contents therefrom.

The flexible cable device is of triple action, due to the high elevation to which the elevator is adapted to be raised. This involves a substantial length of cable and may have a section of chain attached to the free end thereof. When the parts are in their lowered positions, with the container seated on the vehicle during transportation, this length of cable would swing loosely at the side of the vehicle during transportation, which may be especially objectionable in travelling along a highway or around curves therein. Consequently, we have provided a guard for receiving and retaining the cable at each side of the vehicle in such relation to the elevating mechanism that the cable will be received and retained therein automatically as the elevating mechanism is lowered, with the container in place on the vehicle. Retaining means may be provided also to hold the container against side sway.

The hoisting mechanism may be supported on the vehicle for a rocking motion which allows the container to be picked up off the ground to a height of several inches clearance, without any operation of the hoisting means.

Certain embodiments of the invention are illustrated in the accompanying drawings, in which.

Figures 11, 12:
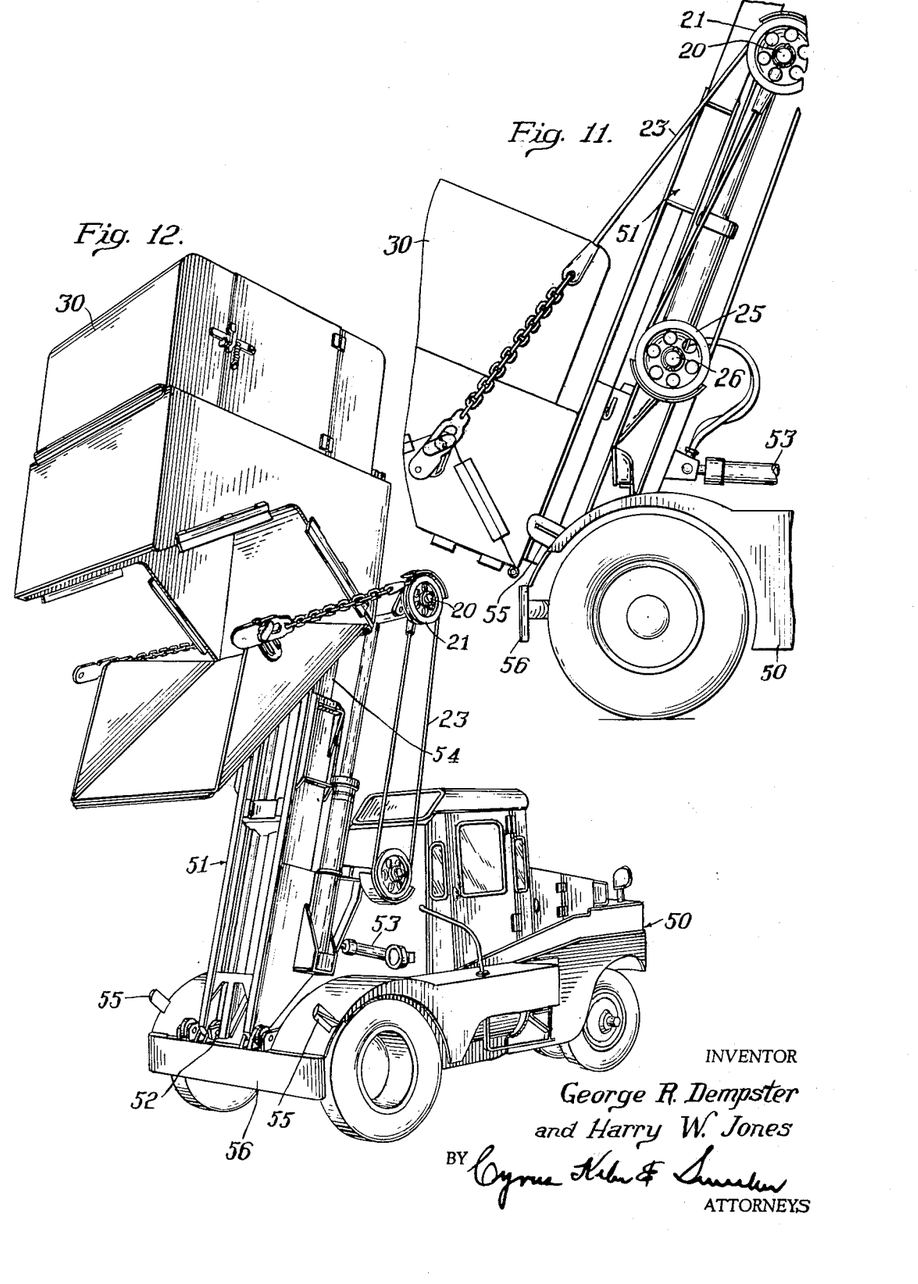
Fig. 11 is a side elevation thereof, with the container in a transporting position.
Fig. 12 is a perspective view of the latter form in dumping position.

The invention is illustrated in Figs. 1 to 9 of the drawings as applied to transporting equipment of the type disclosed in the Dempster patent, No. 2,179,779, granted November 14, 1939, wherein the vehicle is provided at the rear of the chassis with an upwardly extending skid frame mounted on a carriage that is movable bodily forward and backward with respect to the vehicle. However, it is to be understood that the invention is not limited to use with a hoisting unit of that character, because it may be applied readily to hoisting units wherein the skid frame is not movable longitudinally of the chassis frame but may be mounted rigidly thereon with or without a tilting motion, an example of which latter is illustrated in Figs. 10 to 12.

In the embodiment of the invention shown in the drawings, the chassis of a motor vehicle truck is designated generally by the numeral 1. This chassis usually includes a wheeled, steered self-propelled traction unit, and it is so described and illustrated as an example of a vehicle to which this invention may be applied.

Mounted on the chassis 1 is a base frame 2 which may be secured rigidly to the frame of the chassis and extends forward and backward with respect thereto. In the embodiment of the invention illustrated in Figs. 1 to 9, the base frame 2 is provided with trackways, generally indicated at 3 in Figs. 5 and 9, and extending lengthwise thereof, as described more in detail in the Dempster patents, Nos. 2,179,779 and 2,437,806.

Figure 1:
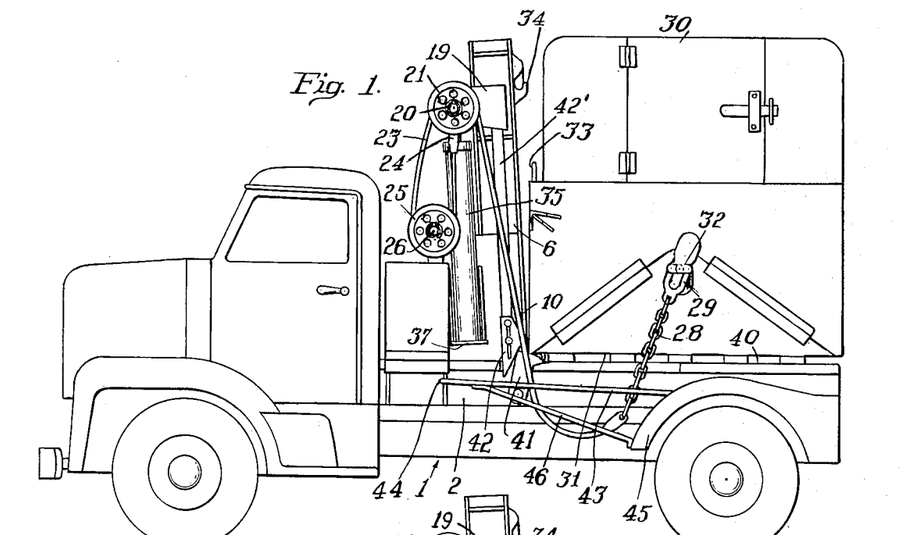
Fig. 1 is a side elevation of the transporting and dumping equipment with the container in place, seated on the vehicle during transportation.
Figure 2:
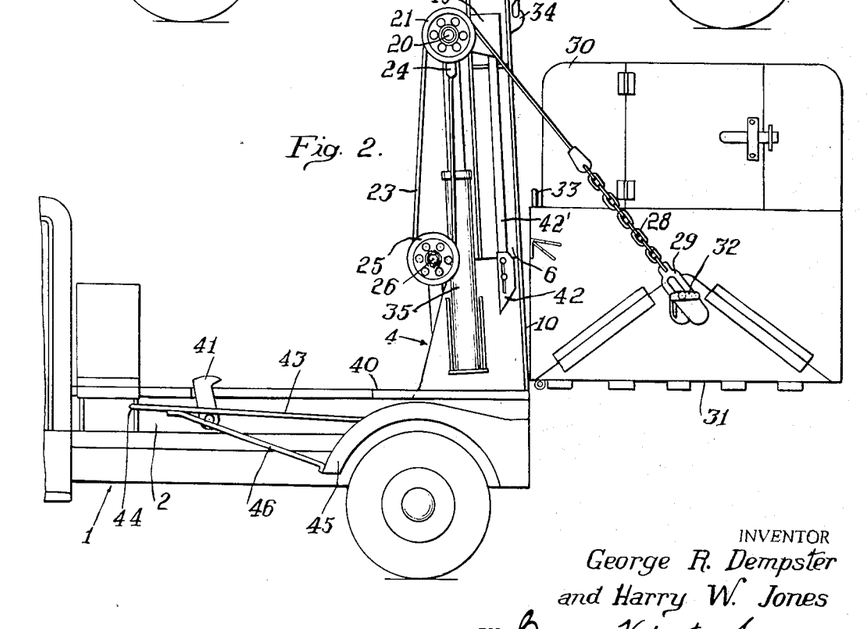
Fig. 2 is a similar view, with the carriage moved to the rear of the vehicle, ready for lifting of the container to its elevated position.

Mounted on the base frame or sub-frame 2 in this embodiment of the invention is a hoisting unit which comprises a carriage, generally indicated at 4, movable lengthwise of the chassis in the tracks 3. The carriage 4 has a plurality of rollers 5 mounted in the tracks 3, which form guideways therefor, for movement of the carriage from a position adjacent the rear end of the chassis frame, as illustrated in Fig. 2, to a position adjacent the front of the chassis frame or sub-frame 2, as illustrated in Fig. 1. Such forward and backward movement usually is accomplished by hydraulic power devices, as set forth more in detail in the above-mentioned patents.

Figure 5:
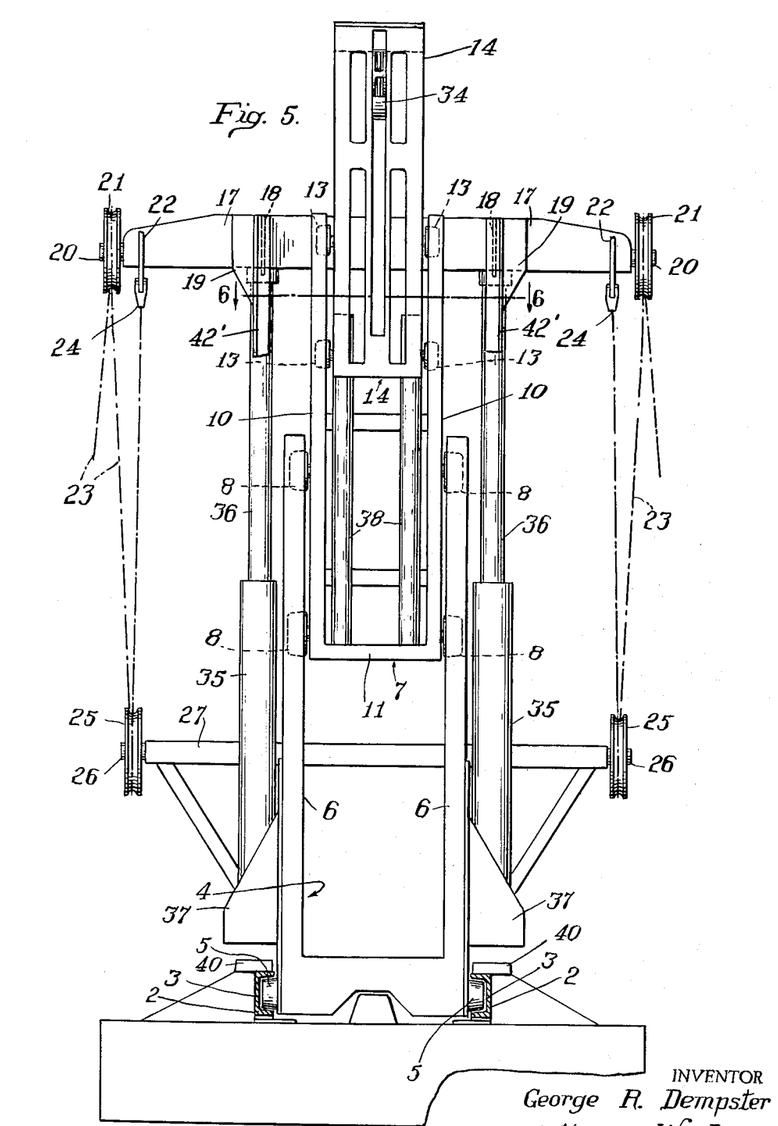
Fig. 5 is a rear elevation of the elevating mechanism.

As shown in Fig. 5, the carriage 4 includes a pair of laterally spaced upright members 6 that are shown in the illustrated embodiment as tilted forward of the vehicle somewhat. These upright members 6 are secured together in rigid braced relation by connecting members, one of which is shown at 6' in Fig. 6, to form a structure which is mounted on the sub-frame 2 for movement forward and backward with respect thereto in the manner of a traveling carriage. At the same time, the upright members 6 coact to form a skidway for the raising and lowering movements of a container with respect to the chassis.

Figure 3:
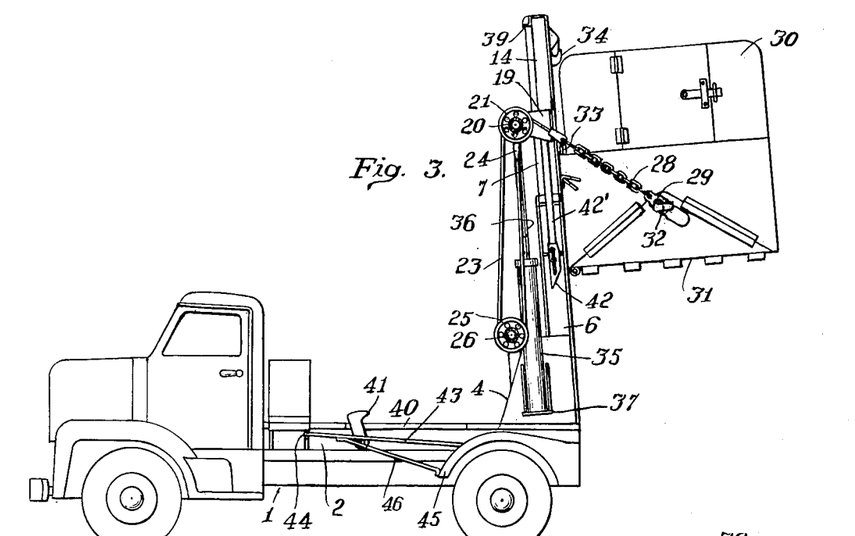
Fig. 3 is a similar view showing the container elevated to a raised position by the elevating means.
Figure 4:
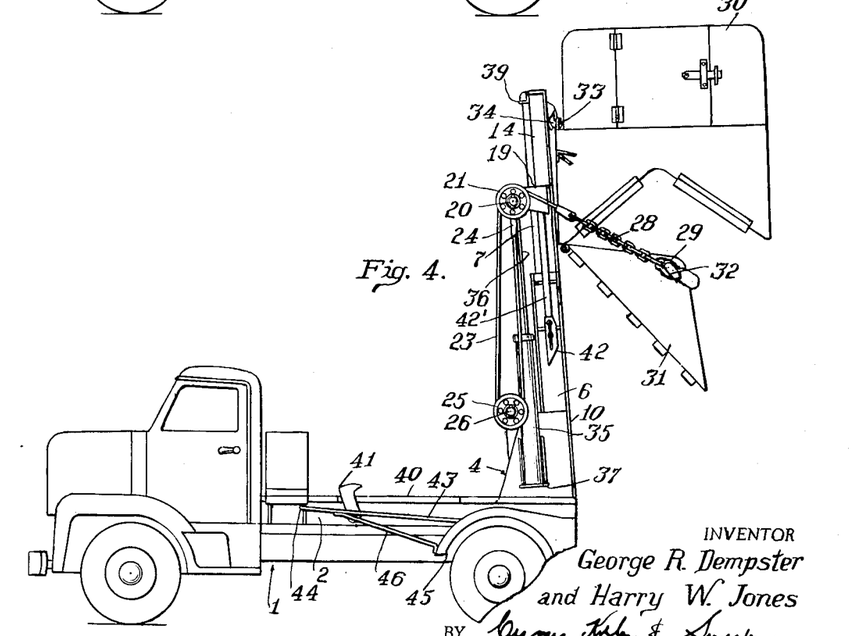
Fig. 4 is a similar view showing the container in elevated dumping position.

Mounted within the traveling carriage 4 is an elevator, generally designated at 7. The elevator 7 is provided with rollers 8 on opposite sides thereof, mounted on stub shafts 16 in guideways 9 formed at the inner faces of the upright members 6, as shown more in detail in Figs. 5 and 6. The elevator 7 is thus retained within the transverse confines of the carriage members 6 and is guided for upward movement relative thereto to projected positions, as illustrated in Figs. 3 and 4. The rearward face of the frame structure is substantially in the upright plane of the rearward face of the skid frame members 6, so as to receive and hold thereagainst the container to be raised and lowered by the hoisting mechanism.

Figure 6:
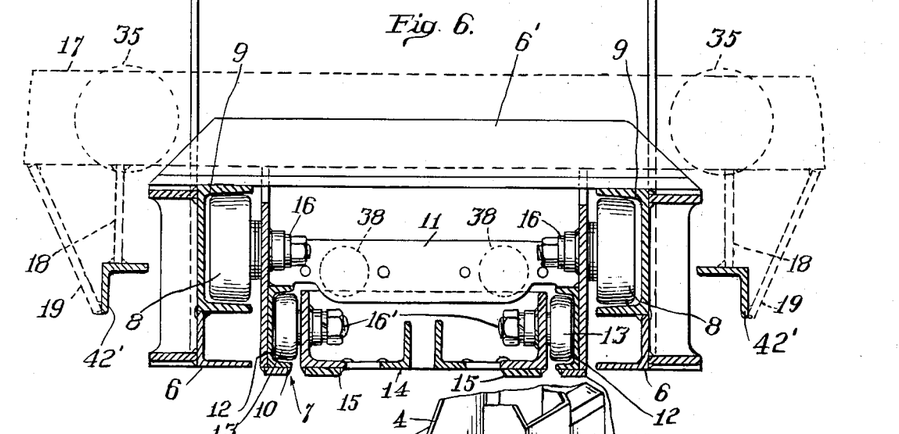
Fig. 6 is a detail cross section therethrough, substantially on the line 6—6 in Fig. 5.
Figure 7:
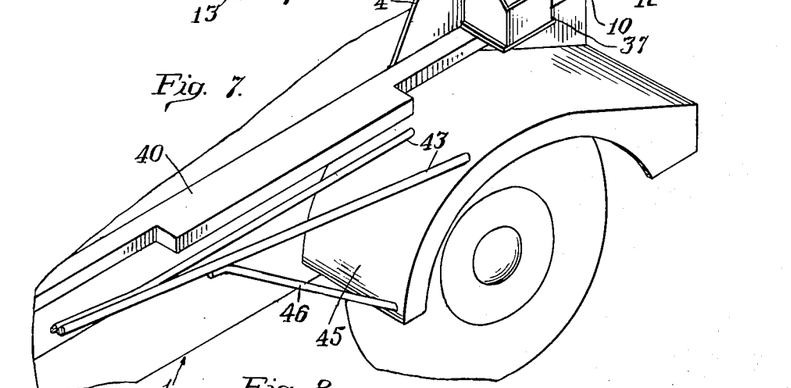
Fig. 7 is a perspective view of the cable rack provided on the vehicle.
Figure 8:
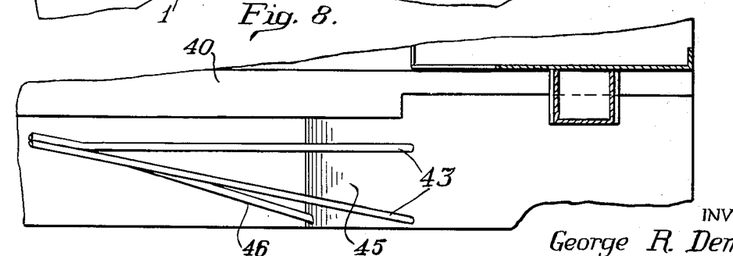
Fig. 8 is a top plan view thereof.

The elevator 7 is fabricated of structural members secured together to form a transversely braced rigid frame, as will be apparent from Figs. 5 and 6. The upright skid members of the elevator 7 are designated at 10 and are shown in Fig. 6 as held in rigid relation to each other by intermediate braces, one of which is indicated at 11.

The inner faces of the skid members 10 are provided with guideways 12 thereon, receiving rollers 13 extending laterally from opposite sides of a shuttle 14, journaled on stub shafts 16' thereon. The shuttle 14 also has skidway forming members 15 at the rearward face thereof, adapted to receive thereagainst a portion of a container to be lifted and transported.

The rollers 8 and 13 are individually mounted upon the respective portions of the elevator 7 and shuttle 14, being journaled on stub shafts 16 and 16', respectively, secured in the adjacent sides of the respective members. These rollers are spaced apart lengthwise of the respective trackways, two or more of which rollers may be used, as desired, on each of the respective members at each side thereof, for holding the parts properly aligned and for freedom of travel lengthwise with respect to each other.

At the upper end of the elevator 7 is a cross arm, generally indicated at 17, extending transversely on opposite sides thereof and outwardly relative thereto to points substantially coextensive with opposite sides of the chassis frame or adjacent thereto, or coextensive with the length of the container, as shown in Fig. 5. A single angle bar may be used for this purpose, as illustrated in Fig. 9, secured rigidly, by welding or otherwise, to the respective opposite side members 10 of the elevator 7, tying these members together at the top of the elevator.

A plate 18 and gusset plate 19 are welded or otherwise secured to each end portion of the cross arm 17, and support thereon a lock cam extension member 42', as hereinafter described.

At the outer ends of the cross arm 17 are mounted stub shafts 20, upon which are journaled sheaves 21 for freedom of turning movement relative thereto. Also secured to the cross arm 17 adjacent the sheaves 21 are saddles 22, one on each projecting end of the cross arm.

Figures 9, 10:
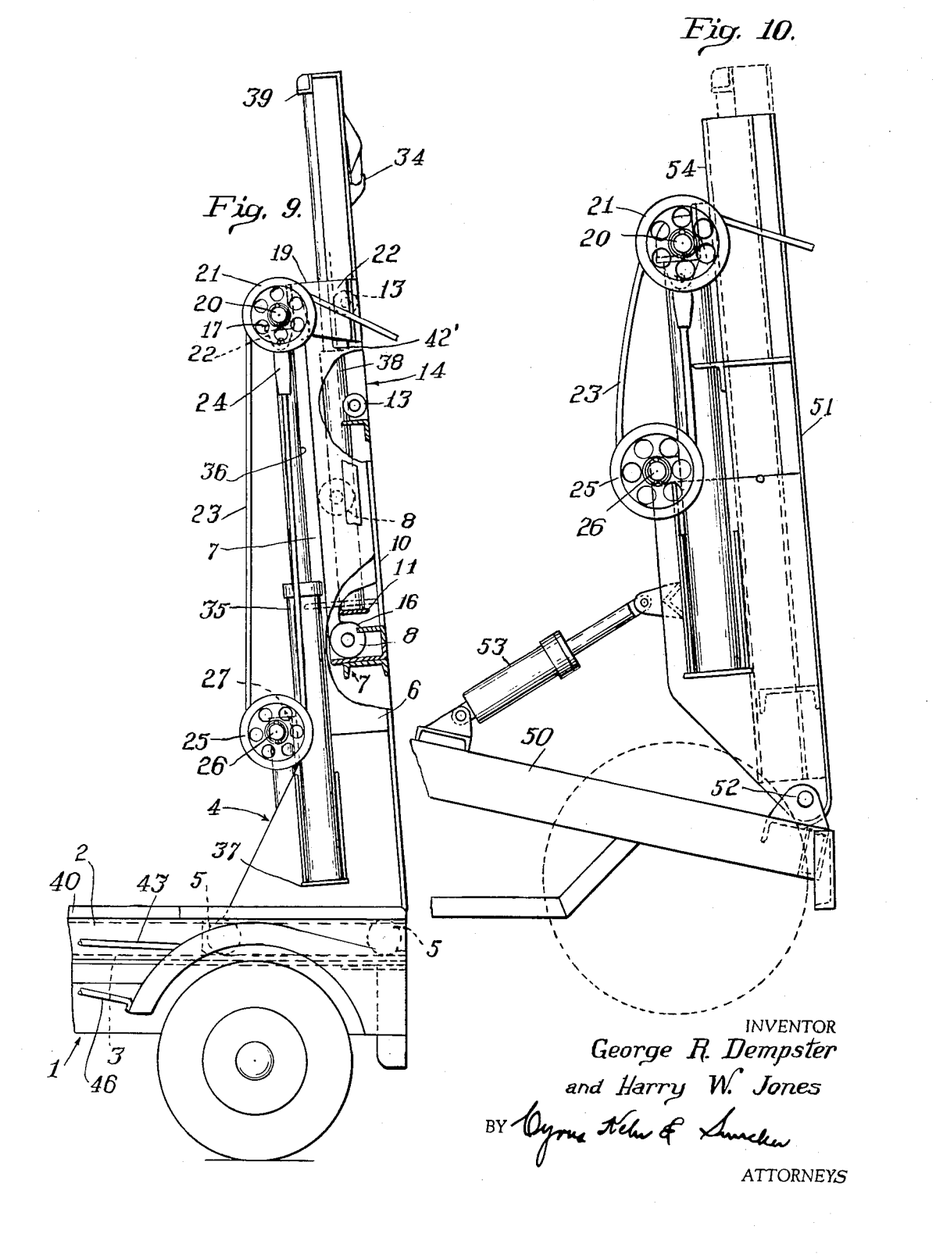
Fig. 9 is an enlarged side elevation, partly in section, of the elevating mechanism.
Fig. 10 is a similar view showing a modified form thereof adapted for tilting motion.

A cable 23 is secured at one end at 24 to each of the saddles 22 and extends downward therefrom around a sheave 25, journaled on a stub shaft 26 mounted on an auxiliary frame cross member 27, projecting laterally from opposite sides of the traveling carriage 4, as illustrated in Figs. 5 and 9. The cable 23 extends upwardly from the sheave 25, after passing around the latter, to and around the sheave 21 on the adjacent end of the cross arm 17, thence rearward therefrom for connection with the container. It is preferred that a section of chain, indicated generally at 28, be connected at the end of the cable 23 for attachment to the container, which chain 28 has a connecting plate 29 thereon for detachable engagement with the container, as hereinafter described.

The container is indicated generally at 30, one form of which is shown merely as an example, and it is recognized that many other types of containers may be used with the hoisting mechanism, as desired. In the embodiment shown, the container 30 is provided with a drop bottom 31 having pins 32 connected with opposite ends of the bottom for attachment thereto of the connecting plates 29 on the cables and chains, as described above. These connections support the container and its contents for dumping, as well as for raising and lowering the container on the hoisting unit.

The container 30 is also provided with a bail 33 on the intermediate portion thereof, at the forward face of the container, adapted for engagement in a hook 34 mounted in the shuttle 14. The hooks 34 are of well known construction and function automatically for retaining the body of the container during dumping. Any suitable or desired form of automatic hook may be used for this purpose, examples of which are illustrated in the Dempster patents, Nos. 2,404,830 and 2,445,106.

While other forms of power means may be used, if desired, for raising and lowering the elevator and shuttle relative to each other and relative to the carriage 4, we prefer to use hydraulic hoists for these purposes, as illustrated in this embodiment of the invention. Double acting hydraulic cylinders may be employed, having fluid connections with opposite ends thereof, but the use of such cylinders and the manner of operation thereof are well understood in the art, and the connections and valves are not shown in detail, being omitted for simplicity of illustration inasmuch as these are well known. The hoists are usually controlled by valves located in the cab of the truck or vehicle.

Power cylinders are shown at 35 on opposite sides of the carriage 4 and having piston rods 36 projecting from the upper ends thereof. The upper ends of the piston rods 36 extend to and are secured to the cross arm 17 of the elevator 7, as illustrated in Fig. 5, for raising and lowering the elevator on reciprocating movement of the piston rods 36 and the pistons connected therewith in the cylinders 35. The cylinders 35 are shown as supported at their lower ends in bracket structures 37 secured upon opposite sides of the carriage 4.

In like manner, one or more hydraulic power devices, generally indicated at 38 in Figs. 5 and 9, are interposed between the cross member 11 of the elevator 7 and the upper end of the shuttle 14. An angle bracket 39 is shown at the upper end of each hydraulic power device 38 for connecting the piston rod thereof with the shuttle. Thus, upon upward movement of the piston in the power device 38, the piston rod thereof will move upward and thus extend the shuttle 14 relative to the elevator 7, the shuttle traveling on the rollers 13 within the tracks 10 of the elevator. Conversely, upon reversal of direction of the fluid into the cylinders of the power devices 38, these are contracted and the shuttle is withdrawn into the elevator in telescoped relation with the latter. This action of the elevator and shuttle may be controlled by suitable valves in the usual way within convenient reach of the operator in the cab of the motor vehicle. In like manner, he may control the forward and backward movement of the carriage 4 on its trackway 3 on the subframe 2 supported on the chassis, as described more in detail in the above-mentioned Dempster patents.

When the container 30 is in its lowered transport position, as illustrated in Fig. 1, it may be set down and rest upon horizontal skid plates 40 that extend lengthwise of the sub-frame 2 and form container supports. Provision may be made for latching the container in its transport position by lock catches 41 mounted at opposite sides of the sub-frame 2 and controlled by locking cams 42. The cams 42 are supported on the elevator 7 by cam extension members 42′, plates 18 and gusset plates 19 to give a box support to each extension member 42′, as described more in detail in the prior application of Harry W. Jones, Serial No. 378,315, filed September 3, 1953.

When the container 30 is in its lowered transport position, as illustrated in Fig. 1, this will result in a considerable amount of slack in the cables 23 and with the chains 28 on the free ends thereof, these might create some hazard or be undesirable when the vehicle is traveling along a highway or around curves therein, unless provision were made for guarding the cables against lateral swinging motion. Such guards are provided herein at the respective opposite sides of the hoisting unit, in positions substantially beneath the respective cables 23 on the elevator, whereby the lowering of the elevator in transport position will cause the respective cables and the connected portions of the chains to drop into such guards and be retained thereby during transportation, in the manner illustrated in Fig. 1.

Each of the guards is shown as formed by guide members 43 (see Figs. 7 and 8) which are in diverging relation to each other toward the rear of the vehicle, preferably being formed of rods welded together at their front ends in substantially a V-shaped relation. The front ends are then held in place by a laterally extending connecting member 44 secured to the adjacent side of the sub-frame 2, while their opposite ends are welded or otherwise secured to the fender 45 of the vehicle. A brace and guide rod 46 extends downward from the outermost rod of the guard 43 at the forward end thereof to the lower portion of the fender and coacts to retain the cable or chain in place against lateral swinging motion during transportation.

In operation, the container may be lifted off the ground when the carriage is in its rear position, as shown in Fig. 2, being drawn up by the raising movement of the elevator 7 to the position shown therein, after which the carriage 4 is moved forward of the chassis, and the container 30 set down on the skid bars 40, as illustrated in Fig. 1. This may be accomplished by the proper manipulation of the hydraulic mechanism controlling the several movements, generally as described above.

When the vehicle reaches the point of dumping, the container 30 is picked up again off the skid bars 40, and the carriage 4 is shifted to the back end of the chassis to the position shown in Fig. 2. Thereafter, the hydraulic power devices 35 may be manipulated to raise the elevator 7 to the desired extent. When the container is to be dumped into a railway car or into a portion of another vehicle at a high elevation, an example of which is shown in Fig. 4, the elevator 7 should be raised to the full stroke of the pistons and piston rods 36 in the cylinders 35. The elevator will be moved upward at a single speed, but the container will be moved at triple speed, due to the flexible cables 23 connected therewith and extending over the sheaves 21 and 25. When the cylinders are at their full stroke, the bottom of the container will be raised to its maximum height and will be ready for dumping.

At this time, the hydraulic power devices 38 of the shuttle 14 may be operated to move the latter to its uppermost position. As the shuttle 14 is raised thereby, the dumping hook 34 will engage in the bail 33 on the container, thus pulling upward or lifting the container and allowing the bottom 31 thereof to drop open. When the shuttle 14 is in its fully raised or elevated position extending from the elevator 7, the drop bottom 31 will be at approximately 45° to the horizontal, as illustrated in Fig. 4. The container may be dumped, if desired, by moving the elevator down after engagement of the container bail with the automatic hook. When the container 30 is in its elevated position, with the bail 33 in the dumping hook 34, the mere lowering of the elevator 7 will accomplish an opening of the drop bottom door for dumping the contents without relative motion of the shuttle 14 with respect to the elevator. In such relation, while the container will move down with the lowering of the elevator, the door will move three times as fast, and therefore open, due to the triple action of the cable 23, as pointed out above.

It will be apparent that the relative motions between the elevator and shuttle, combined with the triple action of the cables 23 connected as described, will accomplish a fast movement of the container to its dumping position or a lowering movement therefrom. Moreover, the construction makes it possible to raise the bottom of the container to a very high level, above the surface of the ground, for dumping at such high elevation as desired, especially when the contents are to be dumped into a railway car or into aircraft or a motor truck, at such a high elevation, and which is a tremendous advantage with equipment of this type. At the same time, very heavy loads can be handled thereby, which has not been possible heretofore.

Moreover, if desired, the skid frame may be mounted rigidly on the back end of the sub-frame or pivotally supported thereon, in place of the travelling carriage, as described above, or it may be mounted directly on the chassis frame. An example of this type is illustrated in Figs. 10 to 12.

In this embodiment of the invention, the hoisting mechanism is supported on a self-propelled vehicle or chassis, generally indicated at 50. This may be of somewhat smaller size than the conventional motor vehicle truck, with a shorter wheel base than customarily provided for the power required in a motor truck, although sufficient motive power is provided for transportation and hoisting movements and for sufficient speed of mobile action to pick up a container, convey it away to a point of dumping, discharge the contents, and then return the container to a point of use.

In this form of the invention, the hoisting unit is substantially the same in construction and manner of operation as described above, including an upright skid frame, generally indicated at 51, which is pivotally supported at 52 on the chassis 50. The parts of the hoisting unit skid frame may be shifted lengthwise with respect to each other for raising the container and for dumping by hydraulic power devices and cable means, as described.

The pivotal support of the hoisting unit at 52 permits of this unit being moved to a vertical position for raising the container to an elevated position, or it may be titled forward over the motor vehicle chassis. This tilting motion may be accomplished by means of one or more hydraulic power devices, indicated at 53, connected respectively with the hoisting unit and with the chassis and interposed therebetween to shift the hoisting unit to different upright positions relative to the chassis, either vertically or inclined, as desired.

The hydraulic power devices 53 may be controlled from suitable valve means within the cab of the vehicle, and such valve means can be used to stop the swinging movement of the hoisting unit at any desired point of tilting action and will hold it in such position so long as desired. As an example, the hoisting unit can be turned to a vertical position for picking up the container and then may be moved forwardly over the chassis to an angle of approximately 26° from the the vertical. Due to the cable connections with the container, this forward rocking motion of the hoisting unit will be sufficient to lift the bottom of the container to a height of approximately six inches from the ground. This will be sufficiently high to enable the container to be transported over city streets and other roads that are smooth, to a point of dumping, without requiring operation of the hoisting means to lift the container to a high elevation or to the height of the chassis. In many instances, no hoisting action will be required for transportation until the vehicle reaches the point of dumping.

This action of picking up the container by a forward swinging action of the hoisting means is made possible by the pivotal support of the hoisting means on the vehicle chassis and the cable connection from the container to an axis that is located forward of the skid frame at a sufficient angle of pull to impart a swinging lifting action to the container upon such forward swinging motion of the hoisting frame. It will be noted that the axis of the stub shafts 20 is spaced forward appreciably of the skid frame 51 and that the angle of pull of the cable 23 is in a direction from a tangent to the sheaves 21 to the lifting pins on the container such that the container will be lifted off the ground by the forward rocking motion of the hoisting unit 51, substantially as will be evident from Figs. 10 and 11.

When it is desired to dump this form of the invention at a high elevation, the action is substantially the same as described above and is illustrated in Fig. 12, showing the bottom of the container at an abnormal height. To accomplish this action, an operation of the hoisting mechanism is required, substantially as described above. However, the hoisting mechanism is not needed to lift the container off the ground to a height of approximately six inches, as noted above, which lifting action may be accomplished by the swinging motion of the hoisting unit.

In this form, the elevator is shown at 54 and is provided with a shuttle therein and cable connections adapted to function substantially as described above.

We have also shown in Figs. 11 and 12 retaining members 55, one of which is mounted on each of the rear fenders of the chassis 50. Each of these retaining members projects upwardly and rearwardly from the point of connection with the chassis, but the rear end of each retaining member is located forwardly of the plane of the rear apron 56 of the chassis. These retaining members are preferably curved or deflected outwardly so as to receive the container therebetween, being spaced apart substantially the length of the container transversely of the vehicle, so that the container will fit therebetween loosely and will be retained in place thereby against side sway during transportation. The retaining members do not project so far rearwardly, however, as to interfere with the striking of the container by the back end of the chassis, and the retaining members would not hit the container in that event. It is often desirable for the operator of the vehicle to back against the container with the apron 56 which will strike one corner or a side of the container to move it around to a straight position for pick up. In that event, the retaining members would not hit the container and therefore there is no serious danger of these retaining members being broken off or dislocated. However, when the container is lifted and tilted forward, it will be encompassed by the retaining members and held in place thereby during transportation.

Such retaining members may be employed with other forms of hoisting units, such, for instance, as that illustrated in Figs. 1 to 9, although they are especially applicable where the hoisting unit is tilted.

While the invention has been illustrated and described in certain embodiments, it is recognized that other variations and changes may be made therein without departing from the invention as set forth in the claims.

We claim:

1. In transporting equipment, the combination of a base adapted to be mounted on a motor vehicle, an upright frame carried by the base having tracks therein, an elevator mounted in the upright frame, roller means connected with the elevator and bearing upon the tracks for guiding the elevator in upright movement relative thereto, said elevator having upright tracks therein, a shuttle mounted within the elevator, roller means connected with the shuttle and bearing upon the tracks on the elevator for guiding the shuttle for upright movement relative thereto, a cross arm connected with the elevator and having guide means on opposite end portions thereof, a flexible cable device on each opposite end of the cross arm connected at one end therewith and extending over the guide means for connection with a container for supporting the container for raising and lowering movements relative to the upright frame, and guide means mounted on the base in guiding relation with an intermediate portion of the flexible cable device between the points of connection of said cable device with the cross arm and the guide means thereon, and means carried by the shuttle for connection with the container for holding the container for dumping action during the lowering movement of the elevator.

2. In transporting equipment, the combination with a motor vehicle, of a frame mounted thereon, an elevator, means mounting the elevator on the frame for raising and lowering movement relative thereto, means for supporting a container on the elevator during said raising and lowering movement including a flexible cable device having a downwardly extending free portion when the elevator is in the lowered position with respect to the frame, and guard means carried by the motor vehicle in embracing relation with said downwardly extending portion of the flexible cable device to prevent lateral swinging movement thereof upon operation of the motor vehicle, said guard means including a pair of bars in fixed diverging relation to each other and connected with the motor vehicle at opposite end portions receiving the downwardly extending portion of the flexible cable device therein and preventing lateral swinging thereof.

3. In transporting equipment, the combination with a motor vehicle, of hoisting mechanism carried by the motor vehicle including an upright skid frame, guide means mounted on the skid frame about an axis spaced forwardly therefrom, separate guide means on the vehicle, a flexible cable device extending over the respective guide means on the skid frame and vehicle and adapted for connection with a container to lift the container onto the skid frame, means for operating the flexible cable device, and means pivotally mounting the skid frame on the vehicle for forward tilting motion relative thereto and thereby lift the container from a supported position on the ground.

4. In transporting equipment, the combination with a motor vehicle, of hoisting mechanism carried by the motor vehicle including an upright skid frame, guide means mounted on the skid frame about an axis spaced forwardly therefrom, separate guide means on the vehicle, a flexible cable device extending over the respective guide means on the skid frame and vehicle and adapted for connection with a container to lift the container onto the skid frame, means for operating the flexible cable device, means pivotally mounting the skid frame on the vehicle for forward tilting motion relative thereto and thereby lift the container from a supported position on the ground, and means connected with the skid frame for swinging the skid frame forward on said pivot means and for holding the skid frame in an inclined position relative to the vehicle.

5. In transporting equipment, the combination with a motor vehicle, of hoisting mechanism carried by the vehicle and including an upright skid frame having a container skid surface thereon, guide means on the skid frame, separate guide means on the vehcile and spaced from the first-mentioned guide means, flexible cable devices extending over the respective guide means on the vehicle and skid frame and adapted for connection with a container to lift the container onto the skid frame, means connected with the flexible cable devices for operating said devices in rectilinear movement to move the container along the skid surface, and means pivotally mounting the skid frame on the vehicle for forward tilting movement relative thereto to lift the container off the ground without rectilinear movement of the flexible cable devices.

6. In transporting equipment, the combination with a motor vehicle chassis having a rear apron, of a frame structure mounted on the chassis, hoisting means mounted on the frame structure for raising and lowering a container to an elevated position with respect to the chassis, and retaining members carried by the vehicle chassis adjacent opposite sides thereof in positions to embrace the container while the latter is supported by the hoisting means to hold the container against side sway during transportation, each of the retaining members being located entirely forwardly of an upright transverse plane through the rear apron.

7. In transporting and dumping equipment, the combination with a container including a body portion and a dumping door connected therewith adapted to be opened for discharging the contents therefrom, of a base structure adapted to be mounted on a motor vehicle, an upright frame carried by the base structure, an elevator movably mounted on the upright frame, a hook having means for engagement with the body portion, means mounting the hook on the elevator for bodily movement relative thereto, and means connecting the dumping door with the elevator for permitting opening of the door upon lowering movement of the elevator without bodily movement of the hook relative thereto.

8. In transporting and dumping equipment, the combination with a container including a body portion and a dumping door connected therewith adapted to be opened for discharging the contents therefrom, of a base structure adapted to be mounted on a motor vehicle, an upright frame carried by the base structure, an elevator movably mounted on the upright frame, a hook having means for engagement with the body portion, means mounting the hook on the elevator for bodily movement relative thereto, means connecting the dumping door with the elevator for permitting opening of the door upon lowering movement of the elevator without bodily movement of the hook relative thereto, said connecting means including a flexible cable device at each end of the container, each cable device being connected at one end with the dumping door and connected with the base structure, and means carried by the elevator and having a guiding engagement with each cable device intermediate the length thereof.

9. In transporting and dumping equipment, the combination with a container including a body portion and a dumping door connected therewith adapted to be opened for discharging the contents therefrom, of a base structure adapted to be mounted on a motor vehicle, an upright frame carried by the base structure, an elevator movably mounted on the upright frame, a hook having means for engagement with the body portion, means mounting the hook on the elevator for bodily movement relative thereto, means connecting the dumping door with the elevator for permitting opening of the door upon lowering movement of the elevator without bodily movement of the hook relative thereto, said connecting means including a flexible cable device at each opposite end of the container, each cable device being connected at one end thereof with the dumping door and at the opposite end thereof with the elevator, and guide means on the base structure and on the elevator for guiding intermediate portions of each cable device.

10. In transporting equipment, the combination with a motor vehicle, of hoisting mechanism carried by the motor vehicle including an upright skid frame having a skid surface along one side thereof adapted to receive a container thereagainst, guide sheaves mounted on the skid frame about an axis spaced appreciably forwardly of the vehicle from the skid surface, separate guide means on the vehicle, a flexible cable device extending over the sheaves and to the guide means and adapted by connection with a container to lift the container against the skid surface on the skid frame, means acting on the flexible cable device for imparting movement thereto to cause a lifting action of the container, and means pivotally mounting the skid frame on the vehicle about an axis spaced rearwardly of the vehicle from the axis of the sheaves for forward tilting movement of the skid frame relative to the vehicle and thereby lift the container from a supported position on the ground.

References Cited in the file of this patent

UNITED STATES PATENTS

| | | |
|---|---|---|
| Re. 23,546 | Dempster | Sept. 9, 1952 |
| 2,289,024 | Lambert | July 7, 1942 |
| 2,514,052 | Gunning | July 4, 1950 |
| 2,542,425 | Oliver | Feb. 20, 1951 |
| 2,582,999 | Lehmann | Jan. 22, 1952 |
| 2,595,959 | Lawless | May 6, 1952 |
| 2,678,743 | Backofen et al. | May 18, 1954 |